United States Patent
Kellner et al.

(10) Patent No.: US 10,707,461 B2
(45) Date of Patent: Jul. 7, 2020

(54) AUTOMOTIVE HIGH-VOLTAGE ENERGY ACCUMULATOR

(71) Applicant: Dr. Ing. h.c. F. Porsche Aktiengesellschaft, Stuttgart (DE)

(72) Inventors: Philipp Kellner, Renningen (DE); Jens Bohlien, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 224 days.

(21) Appl. No.: 15/892,450

(22) Filed: Feb. 9, 2018

(65) Prior Publication Data

US 2018/0261811 A1    Sep. 13, 2018

(30) Foreign Application Priority Data

Mar. 7, 2017   (DE) .................. 10 2017 104 711

(51) Int. Cl.
*H01M 2/10*   (2006.01)
*B32B 7/05*   (2019.01)
(Continued)

(52) U.S. Cl.
CPC ............ *H01M 2/1077* (2013.01); *B32B 3/06* (2013.01); *B32B 7/05* (2019.01); *B32B 15/08* (2013.01);
(Continued)

(58) Field of Classification Search
CPC .. B32B 7/05; B32B 3/06; B32B 15/08; B32B 27/20; B32B 2250/03; B32B 2250/40; B32B 2262/106; B32B 2370/3065; B32B 2457/10; Y02T 10/7005; B60R 16/04; B60K 1/04; B60K 6/28; B60L 50/50;
(Continued)

(56) References Cited

U.S. PATENT DOCUMENTS

2004/0180260 A1 *   9/2004   Somatomo .......... H01M 2/0426
                                                         429/174
2008/0067162 A1 *   3/2008   Suzuki .................. H05B 3/267
                                                         219/209

(Continued)

FOREIGN PATENT DOCUMENTS

| DE | 102017000263 A1 | 7/2017 |
| EP | 2863470 A1 | 4/2015 |
| EP | 3041081 A1 | 7/2016 |

*Primary Examiner* — Gregg Cantelmo
(74) *Attorney, Agent, or Firm* — Leydig, Voit & Mayer, Ltd.

(57) ABSTRACT

An automotive high-voltage energy accumulator includes a housing structure; a plurality of battery modules disposed in a housing space of the housing structure, wherein the housing structure closes the housing space at least in a lateral and/or downward manner; and a housing cover that closes the housing space of the housing structure at least in an upward manner. The housing cover has a multi-layered construction and includes a lower metal layer and an upper metal layer. The lower metal layer and the upper metal layer are mutually disposed so as to be substantially vertically spaced apart, define a cover space therebetween, and are fixedly interconnected at peripheries. A plastics core layer substantially fills the cover space and mechanically interconnects the two metal layers.

13 Claims, 2 Drawing Sheets

(51) Int. Cl.
*B32B 3/06* (2006.01)
*B32B 15/08* (2006.01)
*B32B 27/20* (2006.01)

(52) U.S. Cl.
CPC .......... *B32B 27/20* (2013.01); *B32B 2250/03* (2013.01); *B32B 2250/40* (2013.01); *B32B 2262/106* (2013.01); *B32B 2307/3065* (2013.01); *B32B 2457/10* (2013.01); *H01M 2220/20* (2013.01); *Y02T 10/7005* (2013.01)

(58) Field of Classification Search
CPC  B60L 58/18; B60L 2240/54; H01M 2220/20; H01M 2/1072; H01M 2/1077; H01M 2/1083
See application file for complete search history.

(56) References Cited

U.S. PATENT DOCUMENTS

| | | | | |
|---|---|---|---|---|
| 2009/0142628 | A1* | 6/2009 | Okada | H01M 2/0237 |
| | | | | 429/8 |
| 2011/0143179 | A1* | 6/2011 | Nakamori | B60K 1/04 |
| | | | | 429/99 |
| 2012/0148892 | A1 | 6/2012 | Hoecker et al. | |
| 2013/0022859 | A1* | 1/2013 | Lim | H01M 2/1061 |
| | | | | 429/159 |
| 2014/0093763 | A1* | 4/2014 | Kusunoki | H01G 11/10 |
| | | | | 429/100 |
| 2016/0099442 | A1* | 4/2016 | Kanayama | B60R 16/04 |
| | | | | 429/175 |
| 2016/0293914 | A1* | 10/2016 | Miller | H01M 2/1083 |

* cited by examiner

AUTOMOTIVE HIGH-VOLTAGE ENERGY ACCUMULATOR

CROSS REFERENCE TO RELATED APPLICATIONS

This application claims benefit to German Patent Application No. DE 10 2017 104 711.5, filed Mar. 7, 2017, which is hereby incorporated by reference herein.

FIELD

The invention relates to an electrical automotive high-voltage energy accumulator for storing electrical energy in an electrically driven or partly electrically driven vehicle.

BACKGROUND

Electrical high-voltage energy accumulators for electrically driven motor vehicles operate at operating voltages of several 100 V and therefore represent a fire risk in particular in the case of a crash. The high-voltage energy accumulators are therefore accommodated in battery housings which have a high structural stability, on the one hand, and a high resistance to heat and fire, on the other hand. The high-voltage energy accumulators are typically installed in the vehicle floor such that the housing cover of the energy accumulator housing is assigned the important function of thermally shielding the potentially burning energy accumulator in relation to the vehicle cabin as effectively as possible and for as long as possible.

In the automotive industry there is generally the requirement of a maximum reduction in weight. Therefore, light materials, for example aluminum, magnesium, fiber-reinforced plastics, etc., are often used instead of steel. However, said light materials in relation to steel have a comparatively low melting point and are therefore suitable only to a limited extent for a battery housing or for the housing cover of a battery housing, respectively.

Automotive high-voltage energy accumulators which have a housing structure, the battery modules being disposed in the housing space of said housing structure, are known in each case from EP 2 863 470 A1 and EP 3 041 081 A1. The housing space or the housing structure, respectively, is closed by way of a separate housing cover. The housing cover is composed of a hollow metal body, one or a plurality of tiers from an insulation material being loosely placed in the cover space of said hollow metal body.

SUMMARY

In an embodiment, the present invention provides an automotive high-voltage energy accumulator. The automotive high-voltage energy accumulator includes a housing structure; a plurality of battery modules disposed in a housing space of the housing structure, wherein the housing structure closes the housing space at least in a lateral and/or downward manner; and a housing cover that closes the housing space of the housing structure at least in an upward manner. The housing cover has a multi-layered construction and includes a lower metal layer and an upper metal layer. The lower metal layer and the upper metal layer are mutually disposed so as to be substantially vertically spaced apart, define a cover space therebetween, and are fixedly interconnected at peripheries. A plastics core layer substantially fills the cover space and mechanically interconnects the two metal layers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
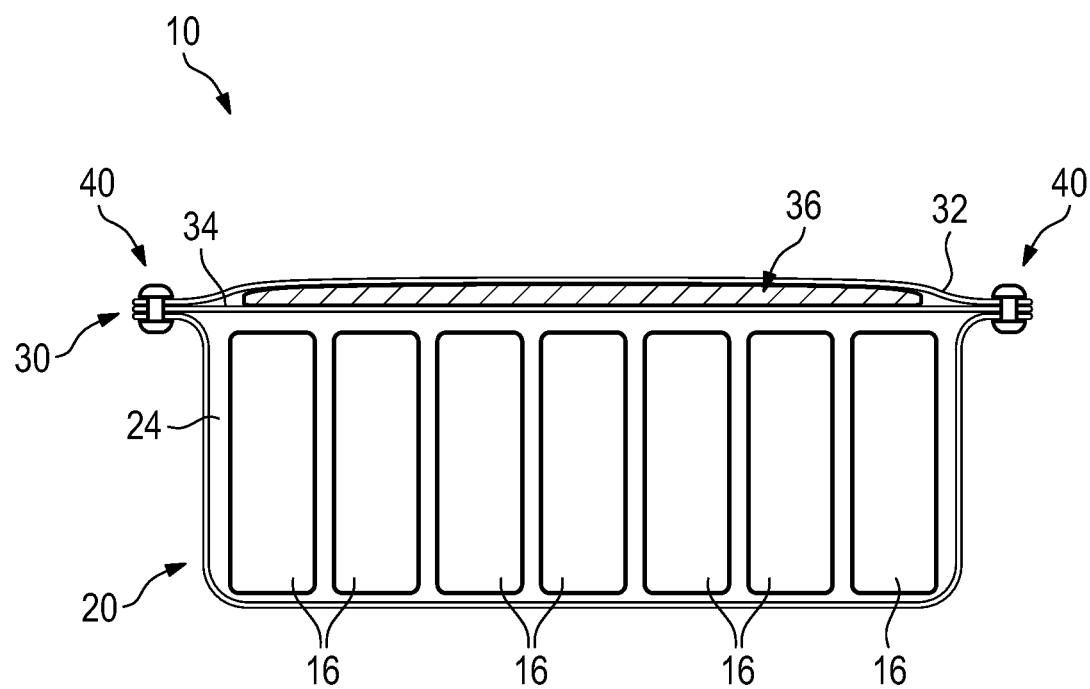
FIG. 1 shows a schematic cross-section of an automotive high-voltage energy accumulator including a housing cover.
Figure 2:
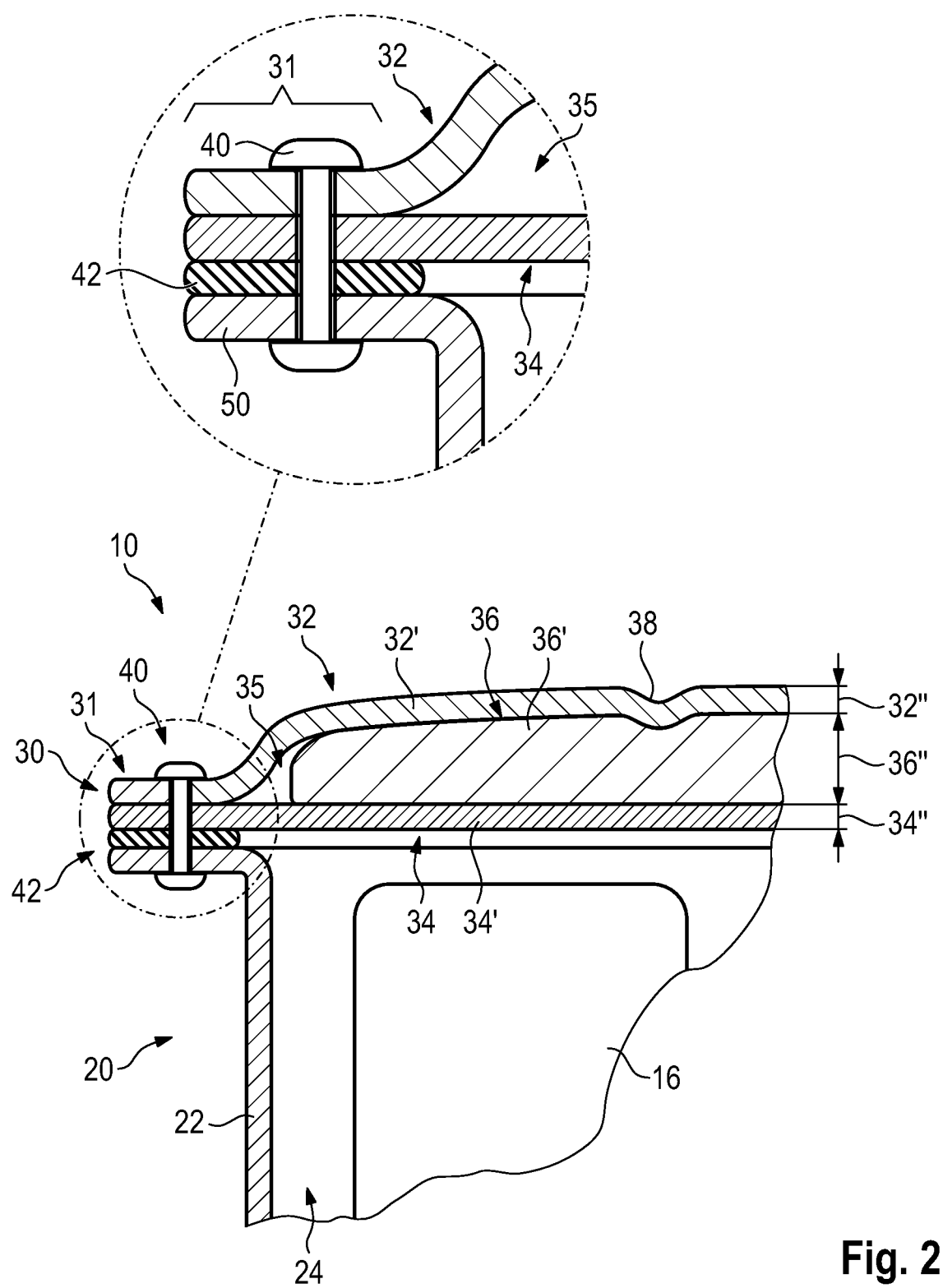
FIG. 2 shows an enlarged fragment of the illustration of FIG. 1 in the flange region.

Embodiments of the invention provide light and structurally stable automotive high-voltage energy accumulators having good fire-proof properties.

An automotive high-voltage energy accumulator according to an embodiment of the invention has a housing structure, a plurality of battery modules being disposed in the housing space of said housing structure, that is to say in the interior space of the housing structure. The battery modules are assembled from a multiplicity of battery cells and conjointly form an electrical source of energy having an operating voltage of several 100 V.

The housing structure at least at the top has a housing opening which is closed by a top-side housing cover. The housing cover is of a multi-layered construction and has a lower metal layer and a separate upper metal layer, the latter being disposed so as to be substantially vertically spaced apart in a consistent manner in relation to the lower metal layer. The two metal layers are preferably disposed so as to be substantially mutually parallel and oriented in a substantially horizontal manner. A cover space is defined between the two metal layers. The two metal layers are directly or indirectly fixedly interconnected at the peripheries, for example adhesively bonded, welded, riveted, or screwed together. A plastics core layer that substantially fills the cover space and mechanically interconnects the two metal layers is disposed in the cover space between the two metal layers. The plastics core layer thus completely fills the major part of the area of the housing-cover metal layers. The plastics core layer can partially or completely be dispensed with only in the peripheral region such that the two metal layers in the peripheral region can also be directly mechanically interconnected.

The plastics core layer is mechanically connected to the upper metal layer as well as to the lower metal layer such that a solid triple-layered sandwich-type composite of the two metal layers and of the plastics core layer is formed. A housing cover which on account of the indirect mechanical interconnection of the two metal layers across the full area has a very high mechanical rigidity in all spatial axes is implemented in this way. The housing cover is nevertheless relatively light since relatively minor layer thicknesses can be chosen for the two metal layers. Particularly light metal-layer materials can therefore be dispensed with such that while aluminum, titanium, or a titanium alloy can in principle be used as a metal-layer material, a suitable steel having a comparatively high melting temperature is particularly preferably able to be chosen for the two metal layers.

The two metal layers can be non-coated or can however also be coated in a corrosion-resistant manner.

The two metal layers are directly or indirectly fixedly interconnected, in particular interconnected in a fluid-tight manner, in the peripheral region, such that the cover space is shielded in a fluid-tight manner in relation to the environment. Since the two metal layers on the external side are composed of metal and in particular of steel, the housing cover has very good fire-proof properties.

A comparatively light and structurally very stable automotive high-voltage energy accumulator having good fire-proof properties is achieved in this way.

The plastics core layer is preferably fixedly connected to the upper metal layer as well as to the lower metal layer across the full area. For example, the layers can in each case be adhesively bonded to one another across the full area. In principle however, another mechanical connection by way of which an interconnection of the three layers is implemented across approximately the full area is also possible.

In principle, the plastics body can be configured so as to be non-reinforced. According to a preferred design embodiment, the plastics core layer is formed by a particle-reinforced or fiber-reinforced plastics body. The plastic can be reinforced with short, long, and/or endless fibers, for example.

The plastics body can particularly preferably comprise fire-retardant filler materials. The core-layer plastics body per se is preferably composed of a thermoplastic, for example of polyamide, polypropylene, or polyethylene.

The housing cover on the periphery particularly preferably has a flange region in which the two housing-cover metal layers are directly interconnected. The housing cover by way of this flange region bears directly on the housing structure. No plastics core layer is thus provided in the flange region. The plastics core layer in terms of the mechanical housing-cover stability is dispensable in the flange region, that is to say in the peripheral region of the housing cover, and cannot achieve any advantageous effect in this region. By omitting the plastics core layer in the peripheral region the weight of the housing cover is reduced in a corresponding manner without the basic properties of the housing cover being compromised on account thereof.

The two housing-cover metal layers preferably have in each case a layer thickness of 0.1 mm to 1.0 mm, that is to say said layers are configured so as to be relatively thin-layered. The layer thickness of the plastics core layer is preferably in the range from 0.1 mm to 2.0 mm. The layer thickness of the plastics core layer particularly preferably corresponds approximately to the cumulative layer thicknesses of the two metal layers combined. A very compact housing cover which has outstanding mechanical stability, is light, and has very good fire-proof properties is achieved in this way.

At least one of the two housing-cover metal layers in the region of the plastics core layer can particularly preferably have a reinforcement embossing. The reinforcement embossing can be configured in particular as an elongate convex or concave groove by way of which a high structural rigidity is implemented. Particularly preferably, parallel bass grooves are provided in each case on both metal layers, wherein the grooves of the one metal layer are preferably disposed so as not to be parallel with the grooves of the other metal layer, but rather intersect at an angle of 90°, for example. On account thereof, the housing cover is specified so as to have a high structural rigidity in terms of all spatial directions.

A separate elastically or plastically deformable sealing element is preferably disposed between the housing-cover flange region and the housing structure, on account of which the gap between the housing cover or the housing-cover flange region, respectively, on the one hand, and the housing structure, on the other hand, is sealed in a fluid-tight manner.

The connection between the housing cover and the housing structure can be established in a materially integral manner, for example by adhesive bonding or welding, in a force-fitting manner, in a form-fitting manner, or by way of a combination of the aforementioned types of connections. The connection can in particular be established by a screw connection or a rivet connection. The connection between the housing cover and the housing structure can preferably be embodied so as to be releasable.

An automotive high-voltage energy accumulator 10, the housing thereof being formed substantially by a housing structure 20 that is configured in the manner of a tub and by a housing cover 30 that closes the housing structure 20 at the top is illustrated in cross section or in longitudinal section, respectively, in FIG. 1. A multiplicity of battery modules 16 which collectively form an electrical energy accumulator having an operative voltage of several 100 V are disposed in a housing space 24 of the housing structure 20.

The housing structure 20 is formed by a housing body 22 which is composed of a deep-drawn sheet metal from a suitable steel. The housing cover 30 is of a multi-layered construction and has a lower metal layer 34, an upper metal layer 32, and in a cover space 35 therebetween a plastics core layer 36 which completely fills the cover space 35 across the major part of the area of the housing cover 30. The plastics core layer 36 is in each case fixedly mechanically connected to the two metal layers 34, 32 by way of an adhesive connection across the full area. The two metal layers 34, 32 are composed of a suitable steel sheet metal body 32', 34', the latter being in each case coated in a corrosion-retardant manner across the full area.

The plastics core layer 36 is formed by a fiber-reinforced plastics body 36' which furthermore contains fire-retardant filler materials. The plastics of the plastics body 36' is polyamide, polypropylene, or polyethylene. The fibers are in particular long fibers and endless fibers from carbon.

The layer thicknesses 32", 34"of the two housing-cover metal layers 32, 34 is in each case approximately 0.5 mm. The layer thickness 36" of the plastics core layer 36 is approximately 1.5 mm.

The upper metal layer 32 has a plurality of reinforcement embossings 38 which when viewed from the outside are configured so as to be concave and which in each case extend across the entire horizontal extent of the plastics core layer 36.

An encircling flange region 31 in which the two housing-cover metal layers 32, 34 are directly interconnected in a planar manner by way of an adhesive bond is provided in the peripheral region of the housing cover 30. No plastics core layer is thus provided in the flange region 31.

The encircling flange region 31 of the housing cover 30 in a planar manner bears on a corresponding flange 50 of the housing structure 20. A separate sealing element 42 in the form of an encircling flat and elastic annular seal is disposed between the housing-cover flange region 31 and the housing-structure flange 50, on account of which the housing space 24 is sealed in a fluid-tight manner in relation to the environment. The two flanges 31, 50 are interconnected in a fixed yet releasable manner by way of a vertical screw connection 40.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An automotive high-voltage energy accumulator, comprising:
   a housing structure, wherein the housing structure is an enclosure having lateral sides which close the housing space in the lateral manner and a housing base closing the housing space in a downward manner;
   a plurality of battery modules disposed in a housing space of the housing structure, wherein the housing structure closes the housing space at least in a lateral and/or a downward manner; and
   a housing cover that closes the housing space of the housing structure at least in an upward manner,
   wherein the housing cover has a multi-layered construction, comprising two metal layers comprising a lower metal layer and an upper metal layer, wherein the lower metal layer and the upper metal layer are mutually disposed so as to be substantially vertically spaced apart, define a cover space therebetween, and are fixedly interconnected at peripheries, and
   wherein a plastics core layer substantially fills the cover space and mechanically interconnects the two metal layers.

2. The automotive high-voltage energy accumulator as claimed in claim 1, wherein the plastics core layer is fixedly connected to the upper metal layer and to the lower metal layer.

3. The automotive high-voltage energy accumulator as claimed in claim 1, wherein the plastics core layer comprises a particle-reinforced or fiber-reinforced plastics body.

4. The automotive high-voltage energy accumulator as claimed in claim 1, wherein the plastics core layer comprises a plastics body that comprises fire-retardant filler materials.

5. The automotive high-voltage energy accumulator as claimed in claim 1, wherein the housing cover has a flange region at which the peripheries of the two housing-cover metal layers are directly interconnected, and
   wherein the flange region of the housing cover bears on the housing structure.

6. The automotive high-voltage energy accumulator as claimed in claim 1, wherein each of the two metal layers of the housing cover has a layer thickness of 0.1 mm to 1.0 mm.

7. The automotive high-voltage energy accumulator as claimed in claim 1, wherein the plastics core layer has a layer thickness of 0.1 mm to 2.0 mm.

8. The automotive high-voltage energy accumulator as claimed in claim 1, wherein at least one of the two metal layers of the housing cover has a reinforcement embossing in a region connected to the plastics core layer.

9. The automotive high-voltage energy accumulator as claimed in claim 5, wherein a separate sealing element is disposed between the flange region of the housing cover and the housing structure.

10. The automotive high-voltage energy accumulator as claimed in claim 1, wherein the housing structure is a single integral piece formed from a drawn piece of sheet-metal.

11. The automotive high-voltage energy accumulator as claimed in claim 1, wherein the peripheries of the two metal layers are entirely fixedly interconnected in a fluid-tight manner along the entirety of the peripheries.

12. The automotive high-voltage energy accumulator as claimed in claim 11, wherein the lower metal layer is planar, and the two metal layers have an encircling flange region at the peripheries, the two metal layers being interconnected at the flange region.

13. The automotive high-voltage energy accumulator as claimed in claim 5, wherein the cover space is in a region of the housing cover circumscribed by the flange region, and wherein the plastics core layer is absent from the flange region.

* * * * *